June 15, 1943.                R. K. STOUT ET AL                2,321,633
                            ALTIMETER OR BAROMETER
                              Filed June 15, 1940
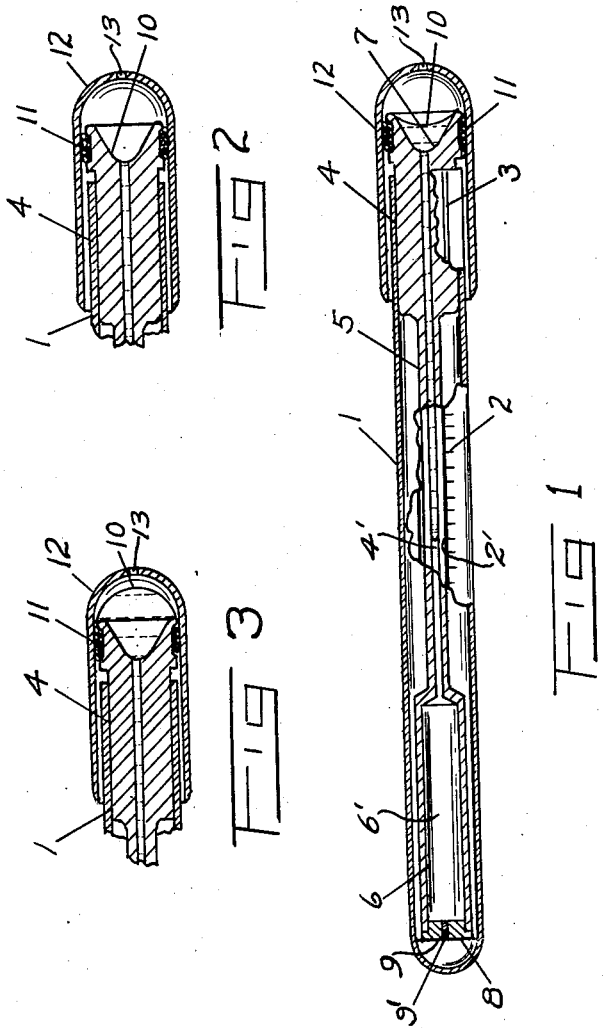
INVENTORS
RAYMOND K. STOUT
CHARLES L. PAULUS
ATTORNEYS Patented June 15, 1943

2,321,633

UNITED STATES PATENT OFFICE 2,321,633

ALTIMETER OR BAROMETER

Raymond K. Stout and Charles L. Paulus,
Dayton, Ohio

Application June 15, 1940, Serial No. 340,703

4 Claims. (Cl. 73—4)

(Granted under the act of March 3, 1883, as
amended April 30, 1928; 370 O. G. 757)

The invention described herein may be manufactured and used by or for the Government for governmental purposes, without the payment to us of any royalty thereon.

The present invention relates to altimeters or barometers or other instruments for determining atmospheric pressure.

Our invention embodies an arrangement of parts, making up an altimeter of a type which may be carried in the pocket. The fact that the device will be maintained at approximately body heat eliminates the necessity for accurate temperature correction, and makes for a simplicity not hitherto obtained in the art.

When used as an altimeter the device included in our invention has means for adjusting for altitude above sea level of the starting point and for change in barometric pressure.

The use of the device as an altimeter is particularly adaptable to use by passengers on airliners, mountain travel either on foot or by automobile, etc.

When used as a barometer our device includes means for adjusting the zero point to accommodate height above sea level.

The use of the device as a barometer is valuable for fishermen, boatmen and the like for predicting weather.

One embodiment of our invention is shown and described herein but we do not mean to restrict the invention to any particular size or shape of parts consistent with a device suitable for carrying in the pocket, nor do we intend to restrict the invention to the use of any particular material or materials for the fabrication thereof.

The invention will be more clearly understood by reference to the drawing, in which:

Figure 1 is a front view, partially in cross-section, showing the complete altimeter or barometer.

Figure 2 is a fragmentary sectional elevation of the device showing the diaphragm in the "sea level" position.

Figure 3 is a fragmentary sectional elevation of the device, showing the diaphragm in the "high altitude" position.

In general our invention uses a mercury column, supported by a partial vacuum and sealed by a rubber or synthetic rubber diaphragm to indicate altitude. The invention also embodies means for adjusting the zero point. The use of a mercury column and a settable zero or sea level point is old in the art but the conventional barometer would be impractical for indicating the altitude of aircraft as it normally requires a 29 inch mercury column and an exposed sump or mercury pot at the bottom of the column. In the conventional device the mercury will be at the top of the tubular container at seat level and the mercury will drop, for example, approximately 16 inches for a change of 15,000 feet in altitude, developing a perfect vacuum on top of the column as the mercury moves. In this case the graduations would be a straight line function of the change in altitude or atmospheric pressure. Using the same figure (15,000 feet) altitude as an example, our invention will provide an altimeter in which the mercury column will move only 2½ inches, at this altitude, from the sea level point. This action is obtained by providing only a partial vacuum over the column of mercury. We also substitute a synthetic rubber, flexible diaphragm for the mercury sump, which in combination with the reduction of scale mentioned above makes a compact unit.

In barometers using a solid mercury column, a change in temperature causes an expansion or contraction of the mercury and thus causes a rise or fall in the height of the column. This, of course, necessitates a temperature correction in order to determine the true reading of the instrument. In our device, however, the small quantity of air which is present in the partial vacuum existing above the mercury, expands and contracts in response to changes in temperature so as to counteract the expansion or contraction of the mercury. For example, if the temperature increases, the mercury expands and tends to rise in the tube, but the air present in the space above the mercury also expands and tends to force the mercury down in the tube. While the coefficient of expansion of air is greater than that of mercury, yet the air, in this case, is so rarefied that its expansion is small and only sufficient to overcome the expansion of the mercury, with the result that changes in temperature do not alter the readings of the instrument. This, together with the fact that the device is intended to be carried in the pocket, where the temperature remains practically uniform, makes it unnecessary to apply any temperature correction to the readings.

The use of the device is simple and the operator can read directly, the altitude above sea level or the altitude above any present point. The latter is obtained by shifting the zero or reference point.

In order to use our device as a barometer it is only necessary to calibrate the scale in inches of mercury, or in "Storm," "Fair," and "Clear," instead of in feet of altitude. If desired, the scale may be adjusted along the tube to correct for the height above sea level.

Fig. 1 shows an embodiment of our device drawn to full scale. The convenient size and compactness of the pocket altimeter is at once apparent from the drawing. It is of approximately the same size and shape as a fountain pen and may be furnished with a clip so as to be carried in the pocket in the same manner as a pen or pencil. The extreme simplicity of the instrument, both in design and in features of construction, make for an inexpensive and reliable altimeter or barometer. As shown in Fig. 1, the instrument is comprised of a tubular element for a mercury column having an enlarged upper end 6, an enlarged lower end 4, and a narrow tubular portion 5 connecting the upper and lower portions 4 and 6. The tubular element may be made of glass or any other suitable transparent material, such as a plastic, and is provided with a small bore 4' extending from a recess 6' in the end 6 to a cavity 7 formed in the bottom of the lower portion 4. The top of the recess 6' is closed by a plug 8 having a hole 9. A diaphragm 10 made of rubber, rubber substitute, or other suitable resilient material is placed over the cavity 7 and sealed to the portion 4 of the element by means of rubber bands and cement 11. This forms a mercury sump which may respond to changes in atmospheric pressure by means of the resilient diaphragm 10. The sump and part of the bore 4' are filled with mercury and a portion of the air in the space above the mercury is then exhausted through the small hole 9 in the plug 8. The hole 9 is closed by a plug 9' after a proper degree of vacuum has been attained over the mercury.

In order to protect the tubular element for the mercury column against injury and also to provide a scale for reading the height of the mercury in the reduced portion 5 of the element, a housing 1, formed either of metal or plastic, is provided. A slot 2' is cut out of the housing so as to expose the tubular portion 5. Scale indicia 2 are marked off along the edge of the slot, these indicia being either in feet of altitude, inches of mercury, or in any other suitable units. The inside diameter of housing 1 is equal to the diameter of the enlarged portion 4, and the housing is provided with a slit 3 so as to enable it to be frictionally held in place on the element. Thus, the housing and its scale may be adjusted along the tube 5 when such adjustment is necessary or desirable. A cap 12 covers the lower end of the instrument in order to protect the diaphragm 10 from injury or from contact with nearby objects which might alter the reading of the device. This cap may be made of any suitable material such as a plastic or metal and is supplied with an air vent 13 to insure that the interior of the cap will always be at the same pressure as the outside atmosphere. Cap 12 is firmly fastened to the lower end 4 of the element in order that the housing 1 may be shifted along the column without removing the cap. It may be fastened to the element in any desired manner, a convenient way being simply to cement it to the element in the vicinity of 11.

Figure 2 shows the diaphragm 10 in a sea level position or against the column 4 due to high atmospheric pressure.

It will be noted that in Fig. 3 the diaphragm is bulged away from the column, which would be the result of reduced atmospheric pressure.

Having disclosed and described our invention, we claim:

1. A pocket barometer of the type utilizing a partial vacuum above the indicating fluid, comprising a short tubular element having enlarged end portions connected by an intermediate portion of reduced diameter, the upper end portion being slightly smaller in diameter than the lower end portion, a reentrant surface formed in the end of said lower end portion, a resilient diaphragm located over the mouth of said reentrant surface, a protective sleeve having an inside diameter substantially equal to that of said lower end portion whereby the sleeve may be slipped over the upper and intermediate portions of said tubular element and frictionally held in place on the lower end portion thereof, said sleeve being provided with a longitudinally extending slot and scale markings located along said slot whereby said markings may be adjusted relative to said tubular element by moving said sleeve on the lower end portion of said element, and a tubular cap fitting over said lower end portion and over the lower portion of said sleeve for the purpose of protecting said diaphragm from injury or disturbance.

2. A pocket-sized atmospheric pressure measuring device of the type utilizing a partial vacuum above the indicating fluid, comprising a tubular element having a reentrant surface formed in one end thereof, a resilient diaphragm located over the mouth of said reentrant surface, a protective sleeve surrounding said element and having a longitudinally extending slot with scale markings provided along said slot, said sleeve being adjustably retained on said tubular element so as to enable said markings to be adjusted relative to said tubular element, and an end cap covering the end of said tubular element which contains said reentrant surface for the purpose of protecting said diaphragm from injury or disturbance.

3. A pocket-sized atmospheric pressure measuring device of the type utilizing a partial vacuum above the indicating fluid, comprising a tubular element having enlarged end portions connected by an intermediate portion of reduced diameter, a reentrant surface formed in the end of one of said end portions, a resilient diaphragm located over the mouth of said reentrant surface, a protective sleeve surrounding said element and having a longitudinally extending slot with scale markings provided along said slot, said sleeve being adjustably retained upon said tubular element so as to enable said markings to be adjusted relative to said tubular element, and an end cap covering the end of said tubular element which contains said reentrant surface for the purpose of protecting said diaphragm from injury or disturbance.

4. A pocket-sized atmospheric pressure measuring device of the type utilizing a partial vacuum above the indicating fluid, comprising a tubular element having enlarged end portions connected by an intermediate portion of reduced diameter, one of said end portions being slightly larger in diameter than the other of said end portions, a reentrant surface formed in the end of one of said end portions, a resilient diaphragm located over the mouth of said reentrant surface, a protective sleeve surrounding said element and having a longitudinally extending slot with scale markings provided along said slot, said sleeve being adjustably retained on the larger of said end portions so as to enable said scale to be adjusted relative to said tubular element, and an end cap adapted to fit over the end portion containing said reentrant surface and also over the neighboring end of said sleeve for the purpose of protecting said diaphragm from injury or disturbance.

RAYMOND K. STOUT.
CHARLES L. PAULUS.